United States Patent

Drager et al.

[11] Patent Number: 5,162,080
[45] Date of Patent: Nov. 10, 1992

[54] ROTARY FLOW CONTROL VALVE

[75] Inventors: Michael E. Drager, St. Paul; Bruce Gillette, Marine on the St. Croix; Edward J. Tischer, St. Paul, all of Minn.

[73] Assignee: Ecowater Systems, Inc., Woodbury, Minn.

[21] Appl. No.: 777,028

[22] Filed: Oct. 16, 1991

[51] Int. Cl.$^5$ .............................................. B01D 24/46
[52] U.S. Cl. ................................ 210/190; 137/625.29; 210/278
[58] Field of Search ................... 137/625.29; 210/190, 210/191, 232, 278, 541; 251/144

[56] References Cited

U.S. PATENT DOCUMENTS 4,136,032  1/1979  Bakken et al. ................. 137/625.29

Primary Examiner—Ivars Cintins
Attorney, Agent, or Firm—Jon Carl Gealow; James M. Wetzel

[57] ABSTRACT

A rotary flow control valve for controlling the cycles of a multicycle liquid treatment apparatus such as a water softener. A pair of rotatable, slotted, circular disks connected to rotate with each other are located in a pair of aligned interconnected cylindrical housings. Rotation of the disks controls the flow of liquid through various paths in the valve. Clamps and clips are provided securing together the parts of the assembled valve.

8 Claims, 8 Drawing Sheets

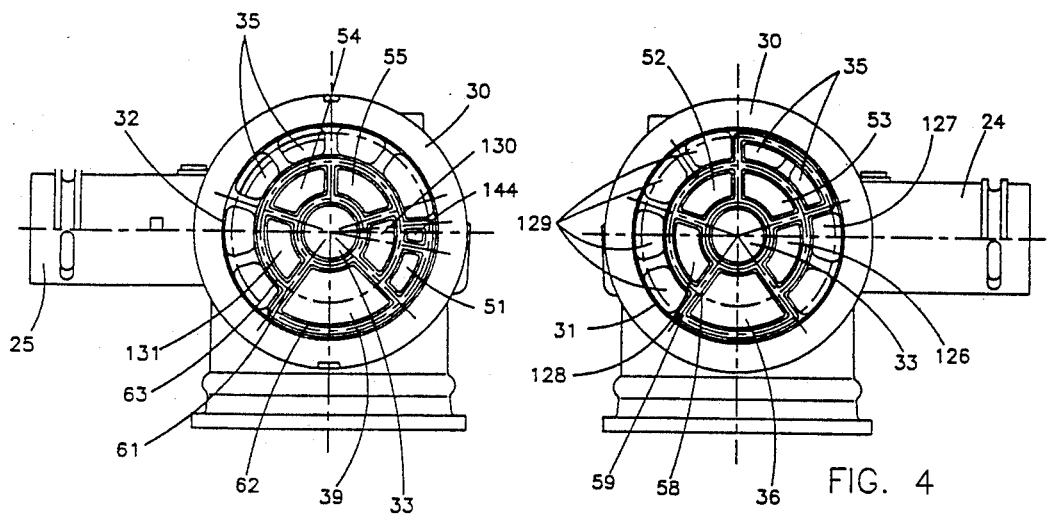
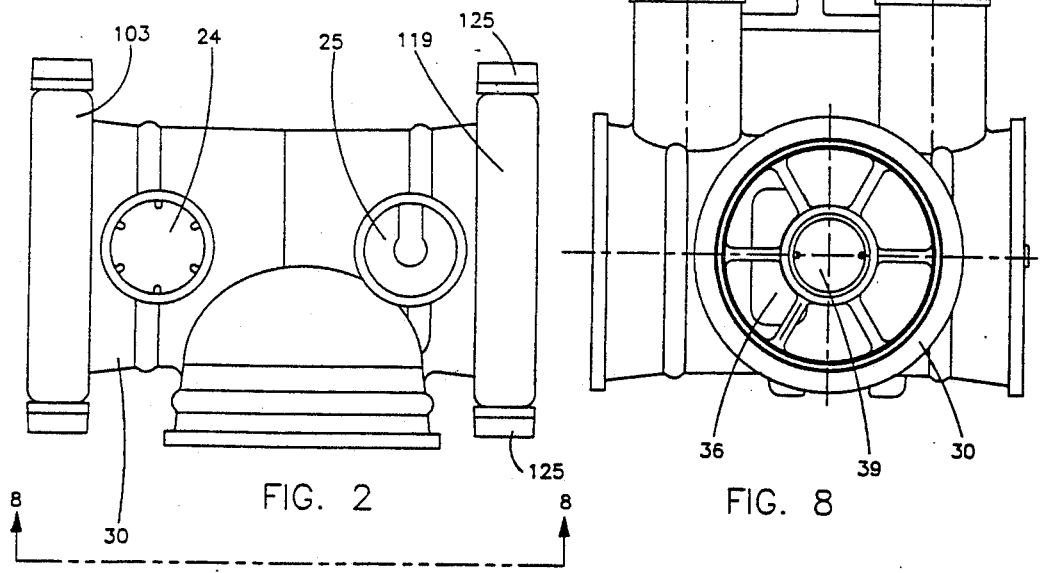

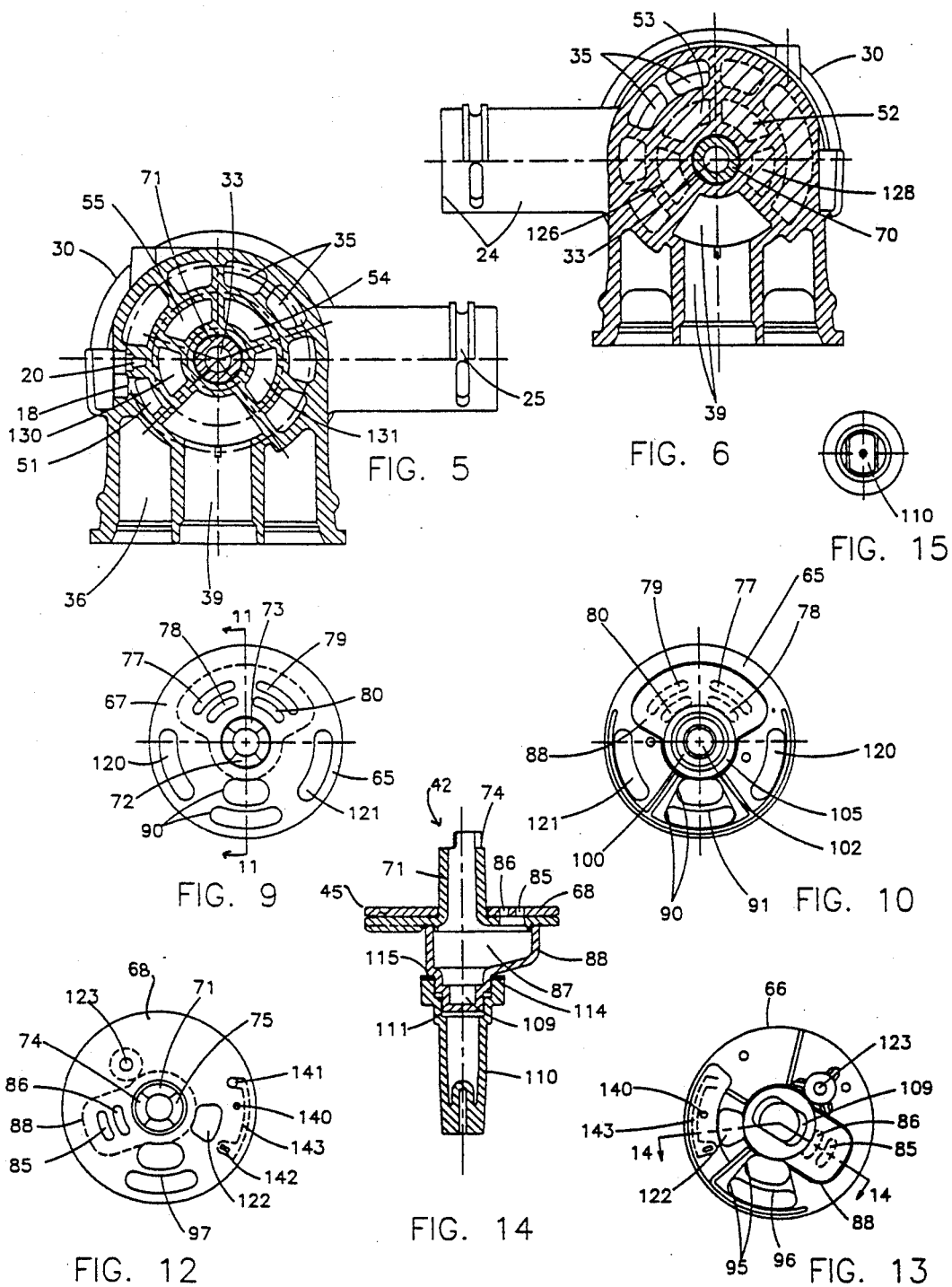

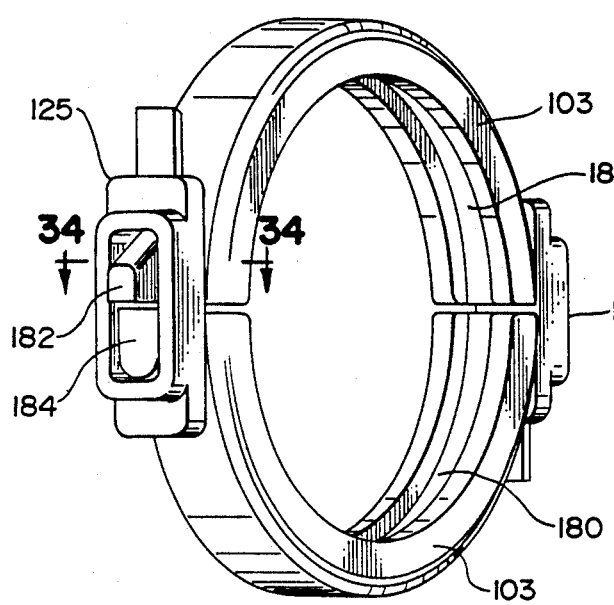
FIG. 31
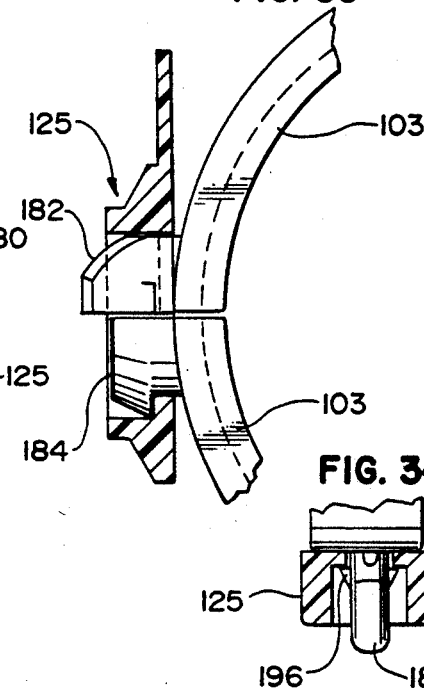
FIG. 33
FIG. 34
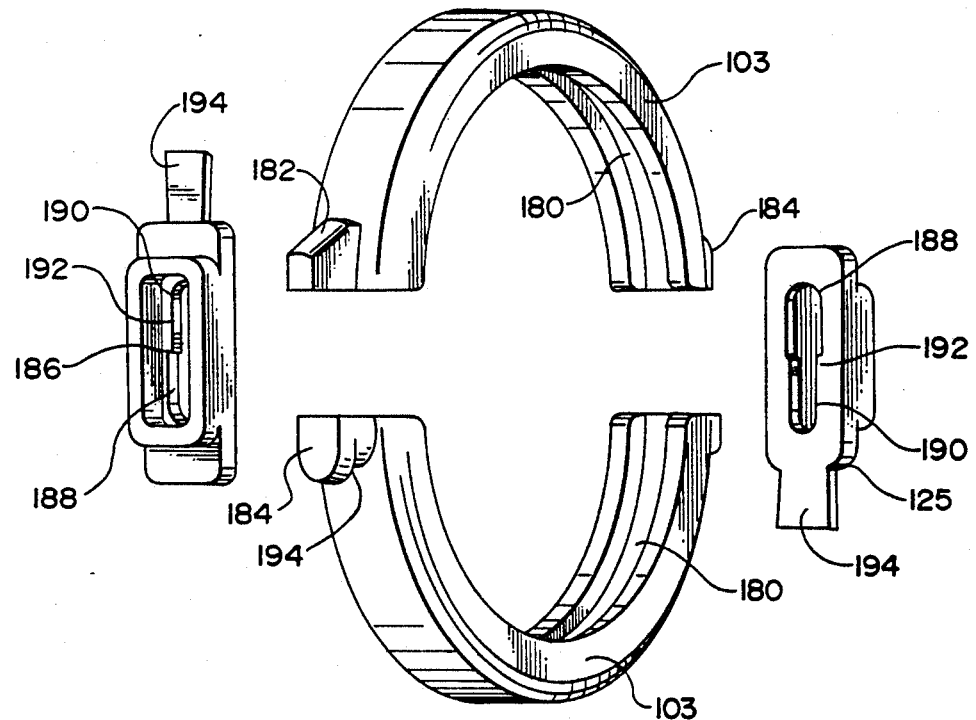
FIG. 32

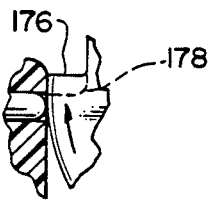
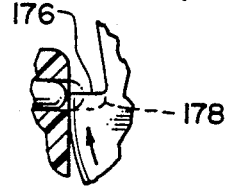
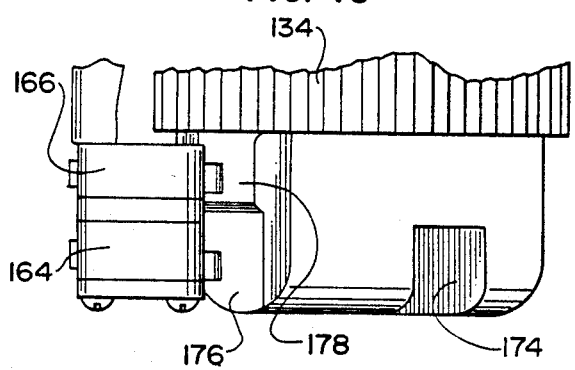
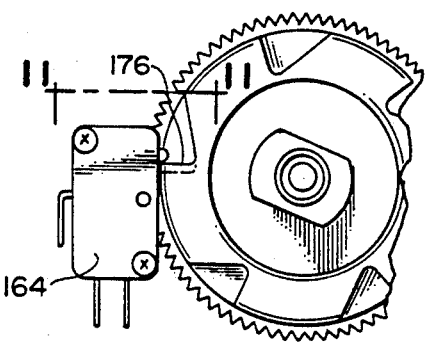
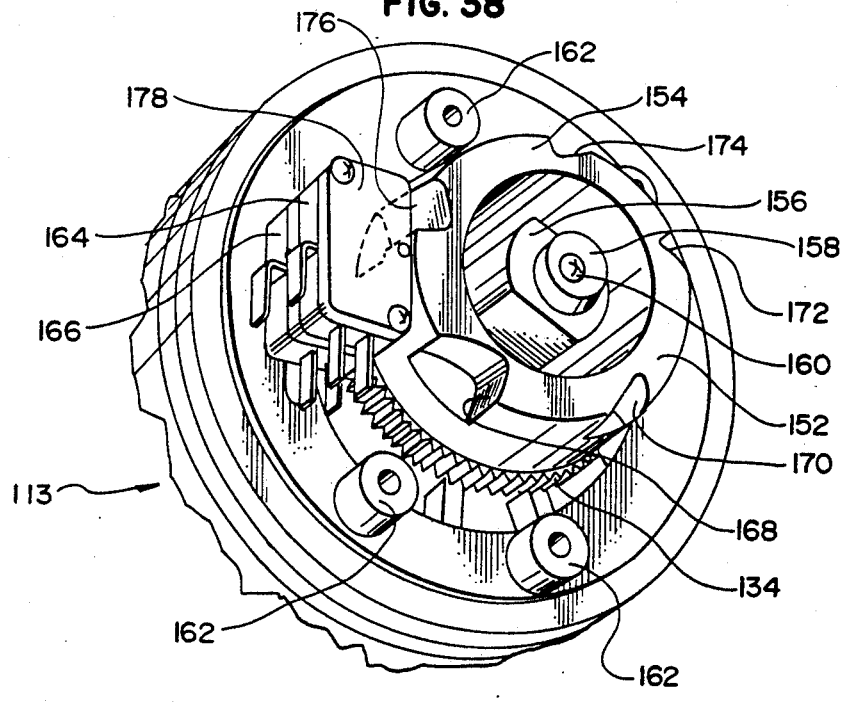

ROTARY FLOW CONTROL VALVE

BACKGROUND OF THE INVENTION

1. Field of the Invention

This invention relates to a rotary flow control valve having use in a multiple cycle liquid treatment apparatus, and more particularly to an improved rotary flow control valve that automatically starts and stops different cycles of the liquid treatment apparatus.

Water softening apparatus using ion exchange resin particles must be regularly regenerated with brine in order to restore or maintain the water hardness removing capacity of the resin particles. The flow control valve for such apparatus must accurately control the volume and velocity of liquid flowing through the resin particles in the treatment tank and in the brining system during each of four or more cycles. Automatic water softening apparatus used in single family residences has to be capable of operating under a wide range of pressure, flow, and hardness conditions, as are typically found in such residences. Prior flow control valves, usable under such a wide range of conditions, were often unduly complicated and difficult to service because they had a large number of moving parts. Also, such prior valves were not capable of being used with different types of liquid treatment equipment, for instance filters which require high flow rates during their backwash cycle.

2. Description of Related Art Including Information Disclosed under Secs. 1.97-1.99

The rotary flow control valve of this invention is an improvement on the liquid flow control valve set forth in U.S. Pat. No. 4,136,032, entitled, Liquid Treatment Apparatus, issued Jan. 23, 1979. Valves manufactured in accordance with the teaching of that patent have served well. However, the need to make improvements therein has been recognized. It is desirable for such a flow control valve to provide a precise number of flow paths, each for a predetermined time period, in a cyclical pattern without need for precise calibration or adjustments. Further, it is desirable that the valve be assembled from a minimum number of components, which components are readily assembled without the need for precise adjustments during or following assembly. The desired improvements relate to the manufacturing of components of the valve, the assembly of the components of the valve and related components of the liquid treatment apparatus, and also to the operation of the valve.

SUMMARY OF THE INVENTION

Accordingly, it is an object of this invention to provide an improved rotary control valve.

Another object is to provide a rotary flow control valve usable with different types of multi-cycle liquid treatment apparatus such as domestic or commercial water softener units, and liquid filters which is capable of successfully operating under a wide range of non-constant flow and pressure conditions.

Another object is to provide a multi-cycle liquid flow control valve which has a low internal pressure drop over a wide range of flow volumes.

Another object is to provide a rotary flow control valve having a small number of moving parts, and which does not require precise adjustments for proper operation.

Another object is to provide a five cycle rotary liquid flow control valve having a pair of rotatable slotted disks wherein essentially all components of the valve can be made by injection molding of plastic.

Another object is to provide a slotted rotatable disk for a liquid flow control valve that holds a gasket in its groove as a slot passes over the gasket, even during sudden increases in liquid flow or pressure.

Another object is to provide mounting arrangements on the valve housing for an aspirator and for a turbine for measuring water flow.

Still another object is to provide a multi-cycle rotary liquid flow control valve for water treatment equipment that is durable, easy to repair and maintain with a minimum number of tools if any, relatively low cost, and which does not possess shortcomings found in similar prior art valves.

These objects are accomplished in accordance with this invention, in one form thereof, by providing a liquid flow control valve having a housing with aligned cylindrical cavities, which are separated by a web having a central bore therethrough and passages therethrough radially spaced from said central bore. A pair of radially extending ports are formed in the sidewall of the housing, with one of the ports extending into one of the cylindrical cavities, and the other port extending into the other of the cylindrical cavities.

A pair of disk assemblies are provided, with a disk assembly being located in each of the cavities. The disks assemblies, which are rotatable in the cavities, are connected by a member which extends through the central bore in the web, such that they are both rotated when driven by a motor attached to one end of the valve housing. The disk assemblies are also provided with radially spaced passages, such that when the disk assemblies are rotated, various passages in the disk assemblies line up with various passages in the web, to provide varying flow paths. End caps are secured to the housing to close the cylindrical housing by a clamping arrangement including semicircular clamps secure at the ends to each other by clips which are secured to or removed from securing projections on the clamps by the application of a force. A pocket is formed on the outer surface of the housing for mounting a aspirator on the housing by the use of a clip. The aspirator is provided with ports which mate with aperture provided in the housing, such that the desired flow paths to the aspirator are provided when it is secured to the housing by the clip.

Other objects and further details of that which is believed to be novel in the invention will be clear from the following description and claims taken with the accompanying drawings wherein:

BRIEF DESCRIPTION OF THE DRAWINGS

FIG. 2 is a back side view of the rotary flow control valve shown in FIG. 1;

FIG. 3 is an end view of the inside of the valve housing taken along the line 3—3 in FIG. 1;

FIG. 4 is an end view of the inside of the valve housing taken along the line 4—4 in FIG. 1;

FIG. 5 is a cross-sectional view taken along the line 5—5 in FIG. 1;

FIG. 6 is a cross-sectional view taken along the line 6—6 in FIG. 1;

FIG. 8 is a reduced scale bottom view taken along the line 8—8 in FIG. 2;

FIG. 9 is an end view of a first flow control disk;

FIG. 10 is an opposite end view of the first disk of FIG. 9;

FIG. 12 is an end view of a second flow control disk;

FIG. 13 is an opposite end view of the second disk of FIG. 12;

FIG. 14 is a cross-sectional view taken along the line 14—14 in FIG. 13;

FIG. 15 is a bottom view of the journal shown in FIG. 14;

FIG. 31 is a perspective view of the clamps and clips used to secure the end caps to the valve housing and the valve housing to a tank flange in their assembled position;

FIG. 32 is an exploded perspective view of the clamps and clips shown in FIG. 31;

FIG. 33 is a fragmentary partially cross-sectional side view of the clams and clip shown in FIG. 31:

FIG. 34 is a fragmentary cross-sectional view taken along the line 34—34 in FIG. 31:

FIG. 38 is an enlarged broken away perspective view of the left end of the valve shown in FIG. 1, with the drive motor removed:

FIG. 39 is a partial end view of the driven gear, cam and control switches shown in FIG. 38;

FIG. 40 is a bottom view of the cam and switches shown in FIG. 38;

FIG. 41 is a fragmentary cross-sectional view shown one position of engagement of the switch actuators with the cam as shown in FIG. 39; and FIG. 42 is a fragmentary cross-sectional view shown another position of engagement of the switch actuators with the cam as shown in FIG. 39.

DETAILED DESCRIPTION OF THE PREFERRED EMBODIMENT

Figure 1:
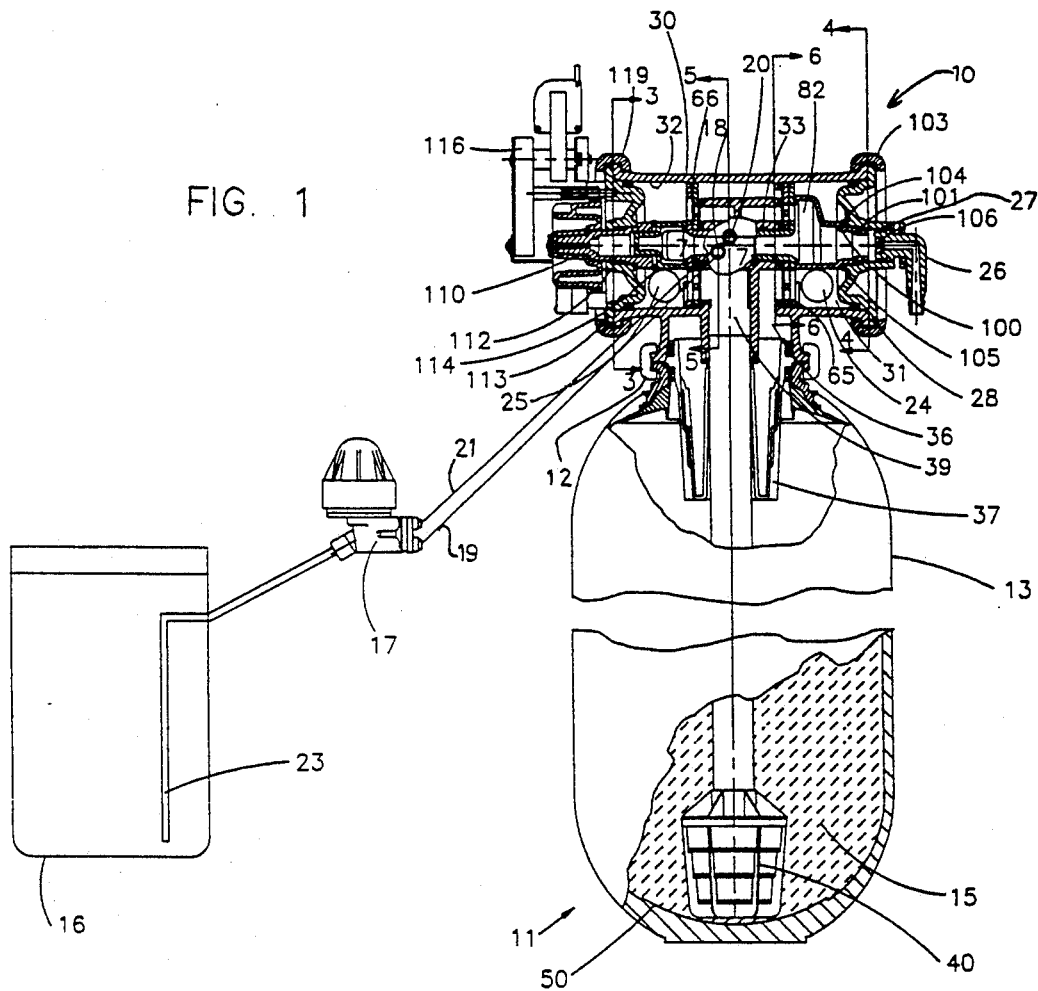
FIG. 1 is a partially schematic, partially broken-away front elevation view of a liquid treatment apparatus including a rotary flow control valve constructed in accordance with this invention.
Figure 7:
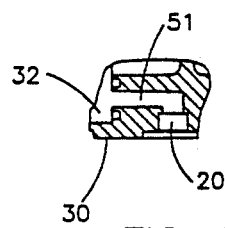
FIG. 7 is a broken-away top view taken along the line 7—7 in FIG. 1.

Referring to FIG. 1, a liquid flow control valve 10 that automatically starts and stops the various cycles of a conventional multiple cycle ion exchange water softening apparatus 11 which is typically installed in a home. Housing 30 of valve 10 is attached by two clamp ring sections 12 to the top of a conventional pressure tank 1 enclosing beads 15 of ion exchange resin. The clamp ring sections are coupled by two clips (not shown). A conventional regenerant solution or brine tank 16 and an aspirator suction nozzle 17 are directly connected to a regenerant liquid refill port 18 and to a regenerant liquid inlet port 20. Tank 16 may contain one or more liquid flow pipes 23 and other conventional components, such as a float controlled shut-off valve (not shown). Valve 10 is connected to a pressurized source of hard water through an untreated or raw liquid inlet port 24 and to a service supply conduit through a treated liquid outlet port 25. A nipple 26 communicating with a waste outlet port 27 in an end cap 28, which is secured to valve housing 30, is used to connect valve 10 to a sewer line or other waste outlet.

Housing 30 has a first cylindrical cavity 31 at its right end which includes inlet port 24 on its back side wall, and a second cylindrical cavity 32 on its left end which includes outlet port 25 on its back side wall as viewed in FIG. 1. The ports 24 and 25 are best shown in FIG. 2. Cavities 31 and 32 are axially aligned and are connected on their central axis by a cylindrical bore 33. A passage o bypass port 35 spaced radially outwardly from bore 33 also connects cavities 31 and 32. The entrance to passage 35 in cavity 31 is only one-third as wide as its outlet into cavity 32, as may be seen in FIGS. 3 and 4. As best shown in FIG. 8, a first opening 36 in housing 30 connects cavity 31 to the inside of tank 13 through a conventional perforated liquid distributor 37 provided at the top of the tank, and a second opening 39 connects cavity 32 to the inside of tank 13 through a conventional perforated liquid collector 40 that terminates near the bottom 50 of the tank and is coaxial at its upper end with the distributor 37. An axially extended flow passage 51 in the side of housing 30 connects cavity 32 to regenerant liquid fill port 18.

Blind recesses 52, 53, 126, 127, 128, and 129 extend into cavity 31, and blind recesses 54, 55, 130 and 131 extend into cavity 32. The blind recesses are not part of the flow paths through the valve, but rather are formed so as to conserve material from which housing 30 is formed. An interconnected group of grooves 57 surrounds passage 35, bore 33, opening 36, and blind recesses 52, 53, 126, 127, 128 and 129 in end surface 58 of cavity 31. A resilient unitary 0-ring gasket 59 is placed within the group of grooves 57. Another interconnected group of grooves 61 surrounds passage 35, bore 33, opening 39, blind recesses 54, 55, 130 and 131, and flow passage 51 in the end surface 62 of cavity 32. A resilient unitary 0-ring gasket 63 is placed within the group of grooves.

Figure 11:
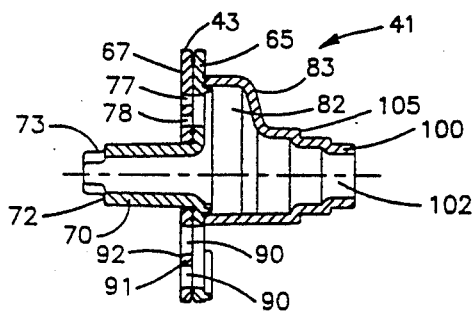
FIG. 11 is a cross-sectional view taken along the line 11—11 in FIG. 9.

The cavities, passages, openings, bore and ports in housing 30 are selectively interconnected by changing the position of various slots in a pair of circular disk assemblies 41 and 42 by rotating the disk assemblies in the housing. Referring to FIGS. 9, 10 and 11, disk assembly 41 includes a circular disk 43 which has a flat smooth face 67 which seals against the exposed surface of the O-ring 59.

Referring to FIGS. 12, 13 and 14, disk assembly 42 includes a circular disk 45 which has a flat smooth face 68 which seals against the exposed surface of the O-ring 63. Disk assembly 42 includes a formed member 65 which has an open-ended, integral, hollow, circular, tubular projection 70 extending from face 67. Disk assembly 42 includes a formed member 66 which has a corresponding open-ended integral, hollow, circular, tubular projection 71 extending from face 68. The end of projection 70 is notched at 72 and 73, and the end of projection 71 is notched at 74 and 75, such that these notches may mate so as to provide a slip-fit that enables projections 70 and 71 to be coupled to each other inside of bore 33. The notches are formed such that may be mated in only one position, thereby insuring the correct orientation of the disk assemblies 41 and 42 with respect to each other. Projections 70 and 71 are axially aligned with each other and with waste port 27.

In the preferred embodiment, the components of circular disk assemblies 41 and 42 are formed from at least two different materials. The circular disks 43 and 44 are preferably formed by molding an unfilled polyphenaloxide such as "Novel". The unfilled polyphenaloxide is preferred, since it provided a smooth, slick surface for engagement with the O-rings 59 and 93. The remaining components of the assemblies 41 and 42 are preferably formed of a glass filled polyphenaloxide such as "Novel". The glass filled polyphenaloxide is preferred because of the greater strength it provides.

As shown in FIGS. 9, 10 and 11, four slots 77, 78, 79 and 80 formed in the face 67 of disk 43 are connected to the inside of projection 70 by a passageway 82 that is defined by a blister 83 extending above the opposite face of the disk and completely enclosing the slots.

As shown in FIGS. 12, 13 and 14, two slots 85 and 86 formed in the face 68 of disk 45 are connected to the inside of projection 71 by a passageway 87 that is defined by a blister 88 extending above the opposite face of the disk and completely enclosing the slots. A slot 90, relatively wide in the radial direction, in formed member 65 of disk assembly 41 is spanned by a bridge 91 having a flat smooth surface 92 in the same plane as the disk face 67. A slot 95, relatively wide in the radial direction, in formed member 66 of disk assembly 42 is spanned by a bridge 96 having a flat smooth surface 97 in the same plane as the disk face 68. Disk assembly 42 also has a small cylindrical through hole 140. Two small openings 141 and 142 formed in the face 68 of the disk 45 are interconnected by an internal channel provided in formed member 66. Surface 92 of bridge 91 presses against the portion of gasket 59 surrounding hole 36 and prevents gasket 59 from being pulled out of groove 57 by sudden increases in liquid flow, or pressure changes, or frictional drags that occur as wide slot 95 passes over hole 39.

A hollow circular journal 100 secured to blister 83 rotatably supports disk assembly 41 in a bearing hole 101 of end cap 28. A circular hole 102 through journal 100 is axially aligned between projection 70 and waste port 27. End cap 28 is removably attached to housing 30 by two substantially semi-circular clamps 103 and two clips 125, as are shown in FIG. 31. A thrust spring 104 compressed between a shoulder 105 on journal 100 and end cap 28 urges flat smooth face 67 of disk 43 against the exposed surface of O-ring gasket 59. A conventional flow control washer 106 is positioned between the journal 100 and the nipple 26 in port 27. A second flow washer 137 is located over opening 123 of disk assembly 12. A coupling bar 109 projects from the outer surface of the blister 88. A circular journal 110 has a slot 111 in its inner face for receiving and coupling with bar 109. Journal 110 is rotatably received in a bearing hole 112 in an end cap 113, and thus provides support for disk assembly 42. A thrust spring 114 compressed between a shoulder 115 on blister 88 and journal 110 urges flat smooth face 68 of disk 45 against the exposed surface of O-ring gasket 63.

A conventional electric gear motor assembly 116 turns a gear 134 in a predetermined rotational angle sequence as controlled by an electronic control circuit. The gear 134 is coupled to journal 110 and thus provides the force which rotates disks 65 and 66 in unison so as to selectively align various slots in each disk with, or to block, the cavities, channel, passages and bores for varying time periods during which the direction of liquid flow in the apparatus is changed and controlled.

Referring to FIGS. 38 through 41, the drive arrangement for the disk assemblies 41 and 42 will be described in further detail. A drive member 152 which includes the driven gear 134 and a cam 154 is secured to the journal 110 to drive the disk assemblies 41 and 42. The journal 110 is provided with an irregular shape, such that a similarly irregularly shaped cup 156 provided on the drive member 52 will fit over the journal 110 in only one position, so as to ensure the proper orientation of the cam 154 with respect to the disk assemblies 41 and 42. An end cap 158 is provided on the cup 156 such that a fastener 160, such as a screw, may be used to secure the drive member 152 to the journal 110. The gear motor 110 is secured to the bosses 162 provided on the end cap 113. A pinion gear on the gear motor 116 as shown in FIG. 1 engages the driven gear 134 to rotate the drive member 152 in a counter-clockwise direction as viewed in FIG. 38. A pair of micro switches 164 and 166 are secured on the end cap 113 in such a position that their actuating members are engaged by the cam 154. Five equally spaced cam surfaces 168, 170, 172, 174 and 176 are positioned to engage the actuator of micro switch 164. An additional cam surface 178 is provided adjacent to ca surface 176 in a position to engage the actuator of micro switch 166.

Upon first energizing the control circuit for the water softening apparatus 11, the control circuit will energize the motor to rotate the gear 134 to the position wherein the actuator of switch 166 passed the position shown in FIG. 41 to the position shown in FIG. 42, wherein the actuator of switch 166 falls into the cam surface 178, but wherein the actuator of switch 164 has not yet reached the cam surface 176. This is considered a home position, from which the five cycles controlled by the valve 110 can be initiated.

To begin the five cycles controlled by the valve 110, the control circuit will energize the motor such that it will rotate to the clockwise direction in the position wherein the actuator of switch 164 will fall within the cam surface 176. The drive motor will then be de-energized for a period of time determined by the control circuit, after which it will again be energized such that the motor will again rotate the drive member 152 in the counter-clockwise direction until the actuator of switch 164 falls within the cam surface 174. Again, the actuation of the micro switch 164 the drive motor will be de-energized by the control circuit. The motor will remain de-energized for a period of time determined by the control circuit. Thereafter, the motor will again be energized and the motor will again drive the gear in the counter-clockwise direction until the actuated switch 164 falls into the cam surface 172. Similarly, the drive member 152 continues to be rotated through the several cycles of the control valve until the position is reached wherein the actuator switch 166 is again engaged in the cam surface 178 to provide an indication to the control circuit that the end of the cycle has been reached. As viewed in FIG. 40, the micro switches 164 and 166 are shown with their actuators engaged in the cam surfaces 176 and 178 in the "home" position.

Two substantially semi-circular clamps 103 and two clips 125 as shown in FIG. 31 through 33 hold end caps 28 and 113 on housing 30. The same clamps 103 and clips 125 are used to secure the valve housing 30 to the pressure tank 13. The semi-Circular clamps 103 and clips 125 are provided with a groove 180 on their inner surface which engages flanges provided on the housings and on the end caps and the pressure tank 13. The groove 180 is formed such that as the clamp rings are drawn together by the clips 125, the grooves will force the flanges toward each other. A first end of each clamp 103 is provided with a first type of securing means 182, while the other end is provided with a second type of securing means 184. The clips 125 have a aperture 186 therein, a first portion of which has a first wider opening 188 and the second portion of which has a narrower opening 190. These openings are provided in a bottom wall 192 in the aperture 186. To install a clip 125 on clamps 103, the second type of securing means 184 is passed through the opening 188 such that a lip 194 formed thereon engages the surface of the bottom wall 192. With the first securing means 182 on the clamp 103 positioned in opening 190, a tab 194 on the clip is pushed toward the clamp 103, such that it passes through the opening 190 until it reaches the position shown in FIG. 34, wherein projections 196 on the sides of the securing means 182 engage the surface of the bottom wall 192. The second clip is installed in a similar fashion.

In order to disassemble the end caps and the tank from the valve body, the application of an appropriate amount of force to the tab 194 will cause the wall 192 to pass over the projections 196 such that the clips can be removed. O-rings should be employed in appropriately placed grooves to seal the joints of the parts of the valve 10, and the valve housing 30 and end caps 28 and 113 may be made by conventional injection molding of a plastic which has a low surface friction, such as partially glass-filled acetal.

Outlet port 25 is provided with a well 139 which opens to the outside. Well 139 is provided to receive a magnetic sensor. A standard nozzle-venturi aspirator 17 is directly secured over ports 18 and 20 as shown in FIG. 32 by a clip 150 which is received in a pocket 152 formed in the housing 30, and a notch 154 from in the mounting portion of the aspirator 17. The nozzle venturi aspirator is connected by a single tube 44 to the liquid flow pipes 23 in the brine tank 16.

Operation of Valve

Figure 17:
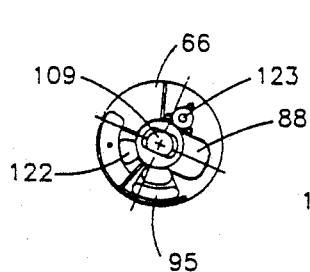
FIG. 17 is a schematic end view of the position of the second disk taken along the line 17—17 in FIG. 16.
Figure 16:
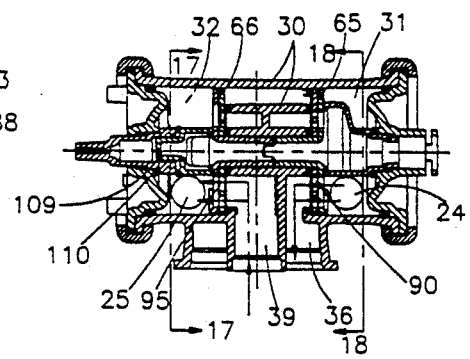
FIG. 16 is a partially broken-away diagrammatic representation of the control valve showing the liquid flow path during the service cycle, with some parts omitted, and with the inlet and outlet ports lowered to better show their relationship with other parts of the valve.
Figure 18:
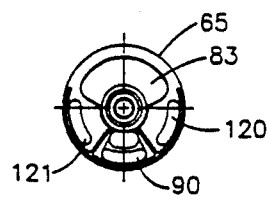
FIG. 18 is a schematic end view of the position of the first disk taken along the line 18—18 in FIG. 16.

Valve 10 will operate in the following manner to automatically control liquid flow in apparatus 10 during a five cycle water softening sequence. During the service cycle, the disks 65 and 66 are positioned essentially as shown in FIGS. 16–18. Slot 90 in disk 65 is aligned with hole 36 in cavity 31 and slot 93 in disk 66 is aligned with hole 39 in cavity 32. The slots 120, 121 and slots 77–80 under blister 83 in disk 65 do not face any open liquid flow paths through cavity 31. Similarly, the slots 122 and 123 and slots 85 and 86 under blister 88 in disk 66 do not face any open liquid flow paths through cavity 32. All of the hard water entering cavity 31 through port 24 leaves through slot 90 and enters distributor 37 through hole 36. The hard water is softened as it flows downwardly through the bed of ion exchange resin beads 15. Soft water enters the lower end of collector 40 and flows up into cavity 32 through aligned hole 39 and slot 95. From cavity 32, the soft water flows to service through port 25.

Figure 20:
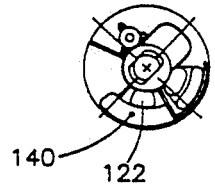
FIG. 20 is a schematic end view of the position of the second disk taken along the line 20—20 in FIG. 19.
Figure 19:
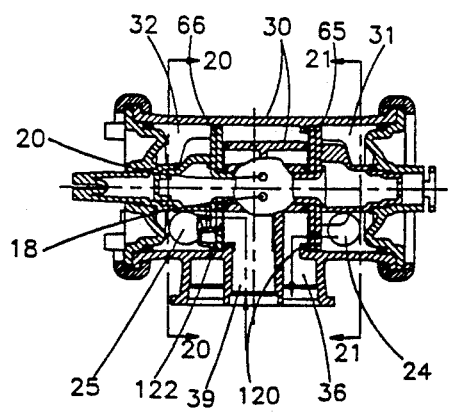
FIG. 19 is a partially broken-away diagrammatic representation as in FIG. 16 showing the liquid flow path during the regenerant tank refill cycle, with a schematic representation of the regenerant liquid refill port.
Figure 21:
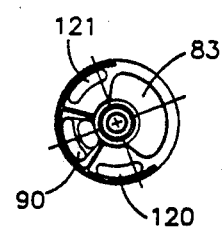
FIG. 21 is a schematic end view of the position of the first disk taken along the line 21—21 in FIG. 19.

The next cycle provides for regenerant tank refill. During this cycle the disks 65 and 66 are rotated essentially to the positions shown in FIGS. 19–21. Slot 120 in disk 65 is aligned with hole 36, and none of the other slots in disk 65 face an open flow path. Slot 122 in disk 66 is aligned with hole 39, and slot 95 is aligned with passage 51 and angled passage 144. Angled passage 51 connects to the refill port 18. Angled passage 144 connects to the inlet port 20. None of the other slots in disk 66 face an open flow path. Hard water entering through port 24 passes through aligned slot 120 and hole 36, and is then softened as described above. The soft water enters cavity 32 through aligned hole 39 and slot 122 and passes to service through port 25. Soft water in cavity 32 also flows through slot 95 into angled passage 151 and into angled passage 144. The water from both passages then flows through the aspirator 17 and through the tube 44 into the brine tank 16. The volume of soft water flowing into tank 16 may be controlled in a conventional manner by a float-controlled shut-off valve.

Figure 23:
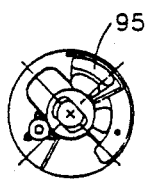
FIG. 23 is a schematic end view of the position of the second disk taken along the 23—23 in FIG. 22.
Figure 22:
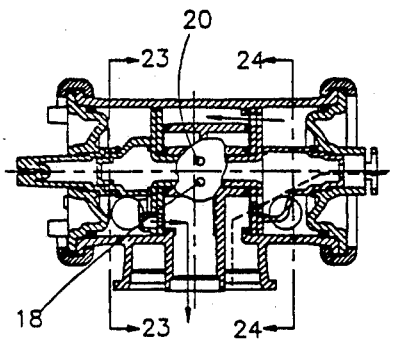
FIG. 22 is a partially broken-away diagrammatic representation as in FIG. 16 showing the liquid flow path during the regeneration and slow rinse cycle, with a schematic representation of the regenerant liquid inlet port.
Figure 24:
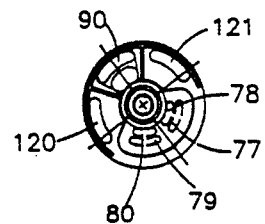
FIG. 24 is a schematic end view of the position of the first disk taken along the line 24—24 in FIG. 22.

The next cycle provides for regeneration and slow rinse of the resin bed. During this cycle the disks 65 and 66 are rotated to essentially the positions shown in FIGS. 22–24. Slots 79–80 beneath blister 83 on disk 65 are aligned with hole 36 and slot 120 is aligned with passage 35. The other slots in disk 65 do not face an open flow path. Slot 95 in disk 66 is also aligned with passage 35 and slot 141 is aligned with angled passage 144. Slot 142 is aligned with hole 39 and slot 140 is aligned with angled passage 51. None of the other slots in disk 66 face an open flow path. Thus disk 66 blocks direct flow from cavity 32 to hole 39, and blister 83 on disk 65 blocks direct flow from cavity 31 to hole 36. Passageway 82 in blister 83 connects hole 36 to the inside of projection 70 and thus provides a flow path through hole 102 to waste port 27. Hard water in cavity 31 flows through slot 90 into passage 35 and then through slot 95 into cavity 32. During this cycle only hard water is available for service through port 25. Hard water from cavity 32 flows through angled passage 51, port 18 (indicated in phantom in FIG. 22), to aspirator nozzle 17. This water flow through nozzle 17 creates a suction that draws regenerant solution out of tank 16 in conventional manner. Since nozzle 17 is constricted, the volume of flow is relatively small. Hole 39 is in essence vented to atmospheric pressure through a path traceable in sequence through collector 40, container 13, distributor 37, hole 36, slots 77–80, passageway 82, projection 70, hole 102, and waste port 27. The regenerant solution flows through line 21, 44, aspirator 17, and port 20 into disk channel 143, hole 39, and then through collector 40 into the bottom of the bed of ion exchange resin beads 15. The regenerant solution passes slowly upwardly through the bed of beads 15 and restores their hardness removing capacity. The spent regenerant solution enters distributor 37 and flows into hole 36, and then through slots 77–80, passageway 82, projection 70, and hole 102 to waste port 27. From waste port 27, the spent regenerant solution flows to a sewer or other disposal destination. After a predetermined volume of regenerant solution has been drawn out of tank 16, the conventional valving therein terminates regenerant solution flow to aspirator 17, but the flow of water through angled passage 51 continues to follow the path described above and thus slowly rinses the regenerant solution from the bed of resin beads 15 in container 13.

Figure 26:
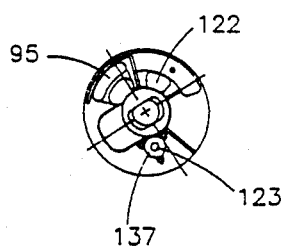
FIG. 26 is a schematic end view of the position of the second disk taken along the line 26—26 in FIG. 25.
Figure 25:
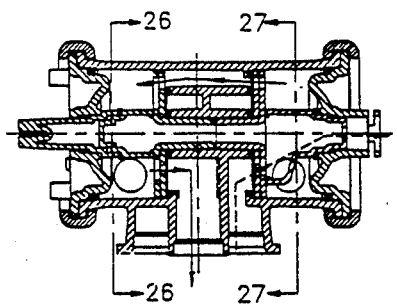
FIG. 25 is a partially broken-away diagrammatic representation as in FIG. 16 showing the liquid flow path during the backwash cycle.
Figure 27:
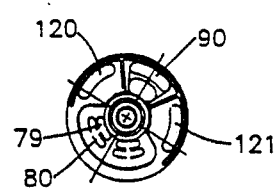
FIG. 27 is a schematic end view of the position of the first disk taken along the line 27—27 in FIG. 25.

The next cycle provides for backwashing of the resin bed. During this cycle, the disks 65 and 66 are rotated to essentially the positions shown in FIGS. 25–27. The slots under blister 83 on disk 65 are still aligned with hole 36 and slot 90 is still aligned with passage 35. The other slots in disk 65 do not face an open flow path. Slot 123 in disk 66 is aligned with hole 39 and slot 95 is aligned with passage 35. The other slots in disk 66 do not face an open flow path. While blister 83 continues to block flow from cavity 31 to hole 36, flow continues from cavity 31 through slot 90 into passage 35 and through slot 95 into cavity 32. Hard water is provided for service through port 25. A greatly increased volume of water flows from cavity 32 through the flow washer 137, then through slot 123 into hole 39, and then through collector 40 into the bottom of tank 13. The greatly increased flow of backwash water agitates the bed of resin beads 15 and tumbles them around in tank 13. This vigorous action cleans the beads and dislodges foreign matter which is washed away with the dirty water through distributor 37, hole 36, passageway 82, projection 70, hole 102 and out through waste port 27.

Figure 29:
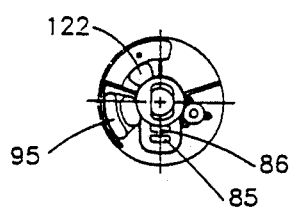
FIG. 29 is a schematic end view of the position of the second disk taken along the line 29—29 in FIG. 28.
Figure 28:
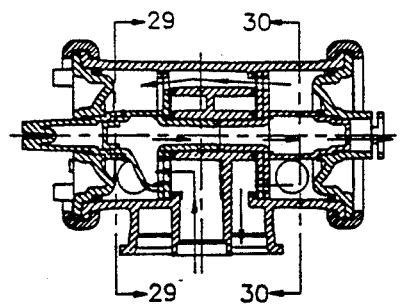
FIG. 28 is a partially broken-away diagrammatic representation as in FIG. 16 showing the flow during the fast rinse cycle.
Figure 30:
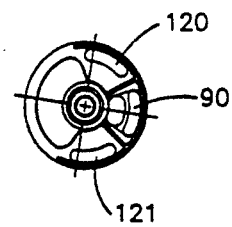
FIG. 30 is a schematic end view of the position of the first disk taken along the line 30—30 in FIG. 28.
Figure 35:
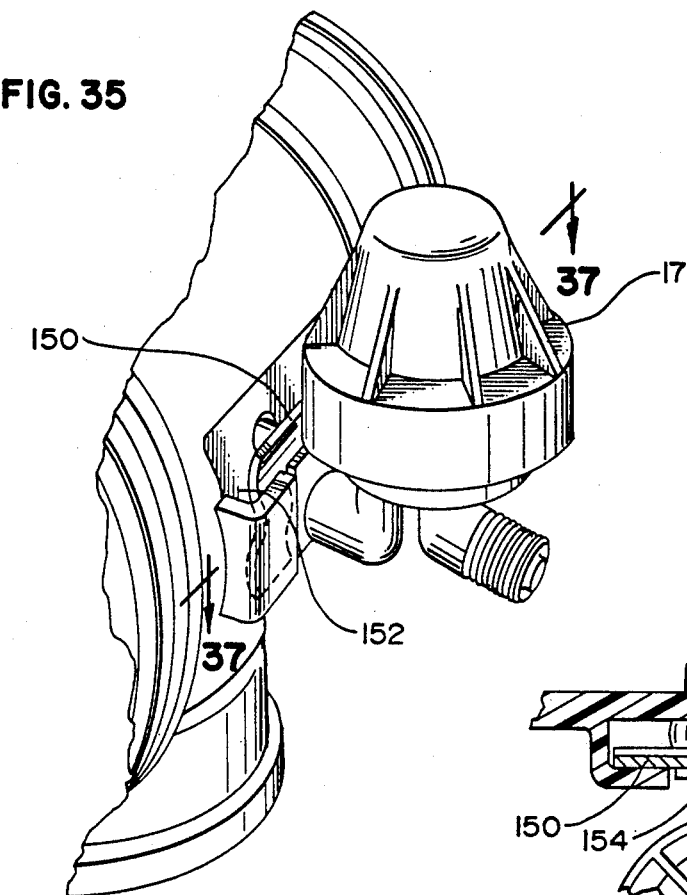
FIG. 35 is a perspective view of a portion of the valve housing, the aspirator and the clip used to secure the aspirator to the housing.
Figure 37:
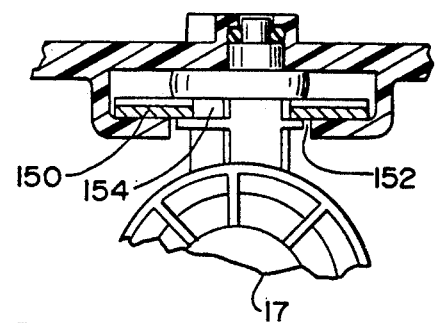
FIG. 37 is a fragmentary cross-sectional view taken along the line 37—37 in FIG. 31.
Figure 36:
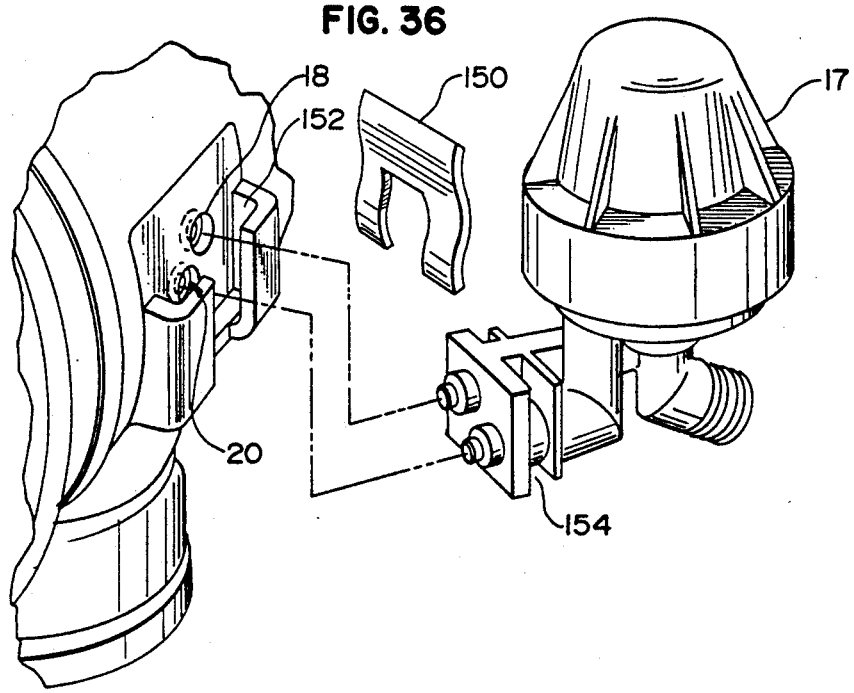
FIG. 36 is an exploded perspective view of the portion of the valve housing, the aspirator and the clip used to secure the aspirator to the housing as shown in FIG. 35.

The next and last cycle before returning to service provides a fast rinse of the resin bed. During this cycle disks 65 and 66 are rotated to essentially the positions shown in FIGS. 28–30. Slot 121 in disk 65 is aligned with hole 36 and slot 120 is aligned with passage 35. The other slots in disk 65 do not face an open flow path. Slots 85 and 86 beneath blister 88 of disk 66 are aligned with hole 39 and slot 95 is still aligned with passage 35. None of the other slots in disk 66 face an open flow path. Hard water from cavity 31 flows through slot 120 into passage 35 and then through slot 95 into cavity 32. The water in cavity 32 is available to service through port 25. A large volume of water from cavity 31 also flows through slot 121 into hole 36 and then through distributor 37 into tank 13. The water flows rapidly downwardly into collector 40, packing beads 15 into a tight bed against the bottom of tank 13 while continuing to rinse the beads. From collector 40 the rinse water flows in sequence through hole 39 and slots 85 and 86 into passageway 87, projections 71 and 70, hole 102 and is discharged through waste port 27. This completes the five cycle water softening process. Disks 65 and 66 are next rotated to the position shown in FIGS. 16–18 to resume a service cycle.

The direction, volume, and sequence of liquid flow in the treatment apparatus can be varied by changing the size and location of slots in the rotating disks 65 and 66 and the position and size of the passages, holes, ports, etc. in housing 30. Cycles can also be added or eliminated in this manner. The volume and direction of liquid flow can be controlled so effectively with the control valve of this invention, that it can be used with commercial type water softeners and also with liquid filters.

It should be apparent to those skilled in the art that what has been described is considered at present to be the preferred embodiment of the rotary flow control device of this invention, in accordance with the patent statutes, changes may be made in the rotary flow control device without actually departing from the true spirit and scope of this invention.

The appended claims are intended to cover all such changes and modifications which fall in the true spirit and scope of this invention.

We claim:

1. A rotary flow control valve for use with a container enclosing a liquid treating material, said control valve comprising:
   a. a housing having a first cylindrical cavity formed by a first cylindrical sidewall, with an untreated liquid inlet port extending from said first cylindrical sidewall, and a second cylindrical cavity formed by a second cylindrical sidewall, with a treated liquid outlet port extending from said second cylindrical sidewall, said cavities being axially aligned, a bore connecting said cavities on their central axes and a passage spaced radially outwardly from said bore also connecting said cavities, first and second holes in said housing connecting said first and second cavities respectively to the inside of said container, said housing having a regenerant liquid inlet port and a regenerant liquid refill port for connection to a regenerant liquid tank, and a waste outlet port;
   b. a pair of separate, rotatable, slotted, circular disk assemblies, each of said assemblies including a circular disk having a smooth flat face, a first one of which smooth flat faces sealingly engages a surface of said first cavity, and a second one of which smooth flat faces sealingly engages a corresponding surface of said second cavity, and coupling means comprising hollow tubular means passing through said bore and connecting said disks to each other; and
   c. a drive motor for rotating said disks in unison so as to selectively align various slots in each disk with or to block said cavities, bore, passage and holes, such that the direction of liquid flow in said apparatus is changed and controlled by rotation of said disks, wherein when said disk assemble is in a position to effect a regeneration and slow rinse cycle for the liquid treating material, said disks are rotated to a position in which a slot in said first disk is aligned between said first cavity and said passage and a slot in said second disk is aligned between said second cavity and said passage, and another slot in said second disk is aligned between said second cavity and said regenerant liquid refill port so that untreated liquid flows from said first cavity through said passage into said second cavity through said outlet port and through said refill port, and said regenerant liquid inlet port is connected by an internal disk assembly passage to said second hole and is open so that regenerant liquid and rinse water flows into said material, and another slot in said first disk is aligned between said first hole and a passageway through said first disk having an open end communicating through said bore with said waste port so that spent regenerant liquid and rinse liquid flow through said first hole and passageway and out said waste port.

2. The rotary flow control valve of claim 1, wherein when said disk assemblies are in a position to effect a backwash cycle for the liquid treating material, said regenerant inlet port and regenerant liquid refill port are closed, and a slot in said second disk is aligned between said second cavity and said second hole so that untreated liquid in said second cavity flows through a flow washer into said second hole into said collector and to said material.

3. The rotary flow control valve of claim 1, wherein a pocket is formed on said housing surrounding said regenerant liquid inlet port and said regenerant liquid refill port, an aspirator being connected to said regenerant liquid inlet and refill ports, and a clip engaging said aspirator and being received in said pocket for securing said aspirator to said housing.

4. A rotary flow control valve for use with a container enclosing a liquid treating material, said control valve comprising:
 a. a housing having a first cylindrical cavity formed by a first cylindrical sidewall, with an untreated liquid inlet port extending from said first cylindrical sidewall, and a second cylindrical cavity formed by a second cylindrical sidewall, with a treated liquid outlet port extending from said second cylindrical sidewall, said first and second cylindrical sidewalls having open ends, said sidewalls at said open ends being provided with circular flanges, first and second holes in said housing connecting said first and second cavities respectively to the inside of said container, said first and second holes being surrounded by a circular flange;
 b. first and second cylindrical endcaps for essentially closing said open ends of said first and second cylindrical cavities,
 c. a pair of semicircular clamps having a internal groove and securing projections on the outer surface at each end, clips engageable with one of said securing projections on each of said clamps, said groove receiving said flange on said sidewall and said endcap, such that when said pair of semicircular clamps are engaged by a pair of said clips, said endcap is secured to said housing.

5. The rotary flow control valve of claim 4, wherein a first pair of said clamps and a first pair of said clips are used to secure said first endcap to said first sidewall, a second pair of said clamps and a second pair of said clips are used to secure said second endcap to said second sidewall, and a third pair of said clamps and a third pair of said clips are used to secure said circular flange surrounding said first and second holes to said container enclosing a liquid treating material.

6. A rotary flow control valve for use with a container enclosing a liquid treating material, said control valve comprising:
 a. a housing having a first cylindrical cavity formed by a first cylindrical sidewall, with an untreated liquid inlet port extending from said first cylindrical sidewall, and a second cylindrical cavity formed by a second cylindrical sidewall, with a treated liquid outlet port extending from said second cylindrical sidewall, said first and second cylindrical sidewalls having open ends, said sidewalls at said open ends being provided with circular flanges, first and second holes in said housing connecting said first and second cavities respectively to the inside of said container, said first and second holes being surrounded by a circular flange;
 b. first and second cylindrical endcaps for essentially closing said open ends of said first and second cylindrical cavities,
 c. semicircular clamps having an internal groove and securing projections on the outer surface at each end, clips engageable with one of said securing projections on each of said clamps, a first pair of said clamps and a first pair of said clips used to secure said first endcap to said first sidewall, a second pair of said clamps and a second pair of said clips used to secure said second endcap to said second sidewall, said grooves receiving said flanges on said sidewall and said endcaps, such that when said pairs of semicircular clamps are engaged by pairs of said clips, said endcaps are secured to said housing, and a third pair of said clamps and a third pair of said clips are used to secure said circular flange surrounding said first and second holes to said container enclosing a liquid treating material, a first type of securing projecting is provided at one end of said clamps, and a second type of securing projection having projections on the side thereof is provided at the other end of said clamp, said clips having an aperture therein to receive said securing projections, said clips first being engaged with said first type of securing projection, and then with said second type of securing projection, such that the projections on the side thereof retain the clip.

7. A rotary flow control valve for use with a container enclosing a liquid treating material, said control valve comprising:
 a. a housing having a first cylindrical cavity formed by a first cylindrical sidewall, with an untreated liquid inlet port extending from said first cylindrical sidewall, and a second cylindrical cavity formed by a second cylindrical sidewall, with a treated liquid outlet port extending from said second cylindrical sidewall, said cavities being axially aligned, a bore connecting said cavities on their central axes and a passage spaced radially outwardly from said bore also connecting said cavities, first and second holes in said housing connecting said first and second cavities respectively to the inside of said container, said housing having a regenerant liquid inlet port and a regenerant liquid refill port for connection to a regenerant liquid tank, and a waste outlet port;
 b. a pair of separate, rotatable, slotted, circular disk assemblies, each of said assemblies including a circular disk having a smooth flat face, a first one of which smooth flat faces sealingly engages a surface of said first cavity, and a second one of which smooth flat faces sealingly engages a corresponding surface of said second cavity, and coupling means comprising hollow tubular means passing through said bore and connecting said disks to each other; and c. a drive motor for rotating said disks in unison so as to selectively align various slots in each disk with or to block said cavities, bore, passage and holes, such that the direction of liquid flow in said apparatus is changed and controlled by rotation of said disks, a drive member includes a driven gear to be driven by said drive motor for rotating said disks, and a cam having at least a pair of cam surfaces, a pair of switches having actuators, an actuator of one of said switches engaging one of said cam surfaces, said actuator of the other of said switches engaging the other of said cam surfaces, such that said switches are actuated to provide an electrical indication of the position of said disks with respect to said housing, when said disk assembly is in a position to effect a regeneration and slow rinse cycle for the liquid retreating material, said disks are rotated to a position in which a slot in said first disk is aligned between said first cavity and said passage and a slot in said second disk is aligned between said second cavity and said passage, and another slot in said second disk is aligned between said second cavity and said regenerant liquid refill port so that untreated liquid flows from said first cavity through said passage into said second cavity through said outlet port and through said refill port, and said regenerant liquid inlet port is connected by an internal disk assembly passage to said second hole and is open so that regenerant liquid and rinse water flows into said material, and another slot in said first disk is aligned between said first hole and a passageway through said first disk having an open end communicating through said bore with said waste port so that spent regenerant liquid and rinse liquid flow through said first hole and passageway and out said waste port.

8. The rotary flow control valve of claim 7, wherein said cam is provided with a number of cam surfaces equal to the number of cycles provided by said valve for actuating said actuator of one of said switches, and a signal cam surface for actuating said actuator of the other of said switches.

* * * * *